(12) United States Patent
Freund et al.

(10) Patent No.: US 11,625,226 B1
(45) Date of Patent: Apr. 11, 2023

(54) DATA FLOW RETYPING FOR FUNCTIONAL PROGRAMMING LANGUAGES

(71) Applicant: salesforce.com, inc., San Francisco, CA (US)

(72) Inventors: Teodoro Freund, Buenos Aires (AR); Mariano Jose de Achaval, Buenos Aires (AR)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/493,374

(22) Filed: Oct. 4, 2021

(51) Int. Cl.
*G06F 8/30* (2018.01)
(52) U.S. Cl.
CPC .................... *G06F 8/311* (2013.01)
(58) Field of Classification Search
CPC ....................................................... G06F 8/311
See application file for complete search history.

(56) References Cited

U.S. PATENT DOCUMENTS

| | | | |
|---|---|---|---|
| 10,896,029 B2 * | 1/2021 | Slesarenko | G06F 8/44 |
| 2019/0391791 A1 * | 12/2019 | Bebee | G06F 8/71 |
| 2020/0320130 A1 * | 10/2020 | Korpman | G06F 16/8373 |
| 2022/0197612 A1 * | 6/2022 | Samuel | G06F 16/9024 |

OTHER PUBLICATIONS

Martin Erwig, "Functional Programming with Graphs" (Year: 1997).*
Benjamin Denton "Go with the flow: Data Flow Analysis for Binary Differencing" (Year: 2014).*
Pantridge et al., "Code Building Genetic Programming" (Year: 2020).*

* cited by examiner

*Primary Examiner* — Phillip H Nguyen
(74) *Attorney, Agent, or Firm* — Sterne, Kessler, Goldstein & Fox P.L.L.C.

(57) ABSTRACT

The type system of a functional programming language, such as DataWeave and/or the like, may be extended to add valuable semantic information to data types (e.g., attributes of data that inform a compiler/interpreter how the data should be used, etc.) that is automatically generated and/or hidden from a developer/programmer. For example, the type system may be configured for flow typing, based on a graph of type dependencies between expressions, without modifying an existing implementation, except at places where extra information can be obtained. Different parts of the type system implementation may be modified, for example, based on one or more injected retyper nodes, to provide more and better type inference.

20 Claims, 8 Drawing Sheets

DATA FLOW RETYPING FOR FUNCTIONAL PROGRAMMING LANGUAGES

BACKGROUND

An integration platform may allow an organization to design, implement, and deploy software systems that integrate and harness resources from across an organization's technical landscape. Such resources may include applications, services, and data sources regardless of the operating systems, programming languages, data types, and other differences in the system resources. For example, an integration platform may include applications that use a functional programming language and/or expression language (e.g., DataWeave, Lisp, Python, Erlang, Haskell, Clojure, etc.) to perform data transformations. Functional programming languages are designed to handle symbolic computation and list processing applications. Functional programming languages are designed on the concept of mathematical functions that use conditional expressions and recursion to perform computation. Functional programming languages may include idioms and typed variables that are not found in dynamic programming languages.

When using a functional programming language, it is difficult for a developer/user, accustomed to dynamic programming languages, to use a variable with some restrictions on its type, perform a runtime check, and attempt to use the same variable with knowledge and/or a confirmation that the runtime check has passed. Even if the developer/user can realize the effect of the runtime check, the type system (e.g., a logical system comprising a set of rules that assigns a property called a type to the various constructs of a computer program, such as variables, expressions, functions, modules, etc.) of the functional programming language may not be configured and/or intuitive enough to produce/output the same conclusion.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

Figure 1:
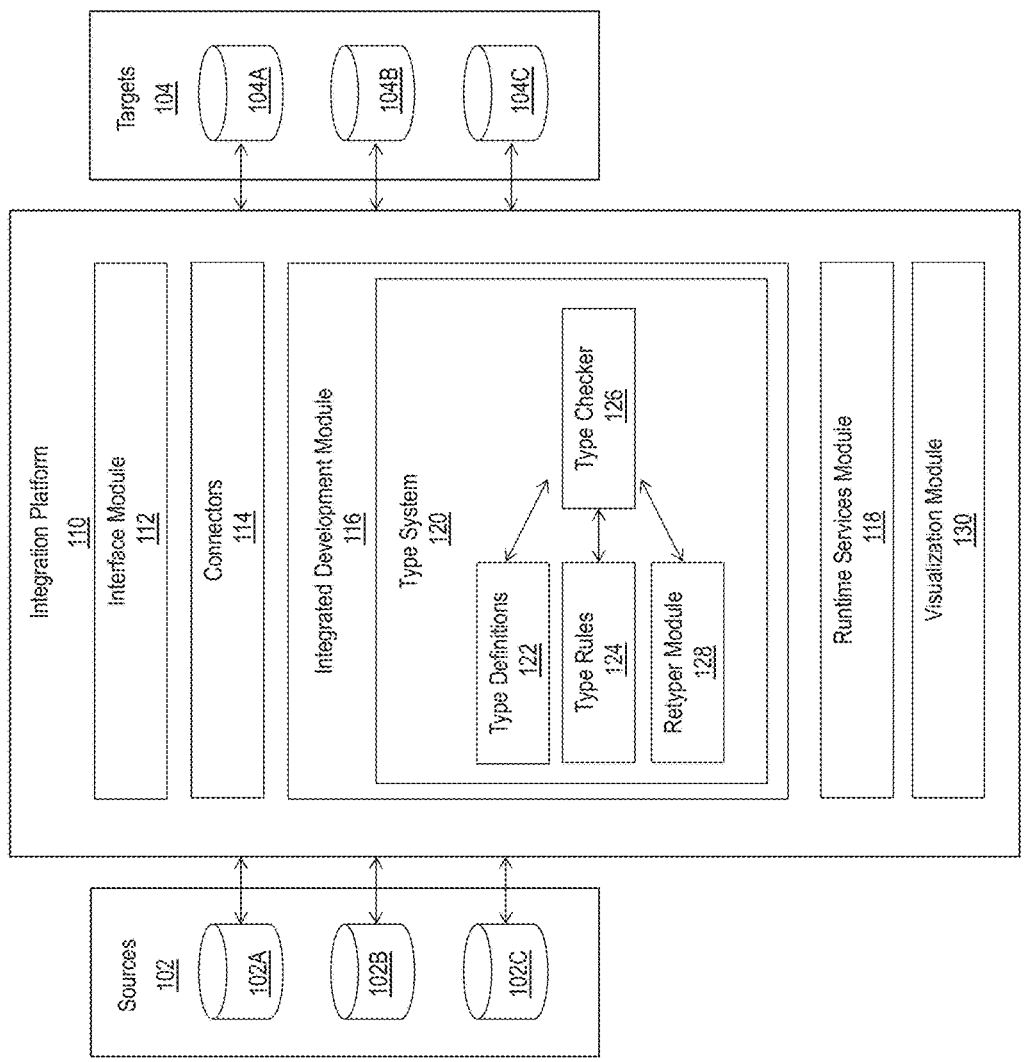
FIG. 1 shows a block diagram of an example environment for data flow retyping for functional languages, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION

Provided herein are system, apparatus, device, method, computer program product embodiments, and/or combinations and sub-combinations thereof, for data flow retyping for functional languages. An integration platform may allow users to create useful business processes, applications, and/or other software tools that will be referred to herein as integration applications, integration scenarios, and/or integration flows. An integration flow may leverage and incorporate data from the organization's disparate systems, services, applications, and third-party systems. An integration platform may bridge divides between these disparate technical resources by centralizing communications, using connectors that allow integration flows to authenticate and connect to external resources, databases, Software-as-a-service (SaaS) applications, and incorporate data and functionality from these external resources into an integration flow. For example, the integration platform may support custom-built applications, legacy applications, database applications, cloud-based applications, enterprise-resource-planning applications, and/or the like. Applications and/or associated data of and/or supported by the integration platform may be configured with/on different devices (e.g., servers, etc.) at different locations (e.g., data centers, et.), and/or may be accessed via a network (e.g., cloud, Internet, wide-area network, etc.). Data transferred between applications of and/or supported by the integration platform may take on many forms and a functional programming and/or expression language may be used for data transformation.

In some instances, when using a functional programming language, it is difficult for a developer/user, accustomed to dynamic programming languages, to use a variable with some restrictions on its type, perform a runtime check, and attempt to use the same variable with knowledge and/or a confirmation that the runtime check has passed. Even if the developer/user can realize the effect of the runtime check, the type system (e.g., a logical system comprising a set of rules that assigns a property called a type to the various constructs of a computer program, such as variables, expressions, functions, modules, etc.) of the functional programming language may not be configured and/or intuitive enough to produce/output the same conclusion. For example, consider the code below:

fun square (x: Number|Null): Number=
if (x==null)
−1
else
x*x

The function square takes a value of x, which is known to be either a number (e.g., −1) or a null. The function square is expected to return a Number (e.g., −1). The function square invokes a check as to whether x is equal to Null, if it is, it just returns −1, if it is not, a system compiler and/or programmer then knows that x has to be a Number (since it is not equal to null), and executes/performs the operation x*x. However, traditional type systems are unable to determine that on the else branch of the function square, x can only be a Number, and will emit an error stating that it is not possible to multiply two Null values on the incorrect assumption that x could be Null in the else branch.

Accordingly, a need exists for systems and methods that provide a solution for data flow retyping for functional programming languages, for example, within an integration platform. The system, apparatus, device, method, computer program product embodiments, and/or combinations and sub-combinations thereof described herein may be used for single variable retyping, multivariable retyping, and/or multiple level retyping (to address multiple type guards, restrictions, restraints, and/or the like). The system, apparatus, device, method, computer program product embodiments, and/or combinations and sub-combinations thereof described herein may be used to add valuable semantic information to data types (e.g., attributes of data that inform a compiler/interpreter how the data should be used, etc.) that is automatically generated and/or hidden from a developer/programmer. The system, apparatus, device, method, computer program product embodiments, and/or combinations and sub-combinations thereof described herein may be used to extend an existing type system with flow typing, based on a graph of type dependencies between expressions, without modifying an existing implementation, except at places where extra information can be obtained. The system, apparatus, device, method, computer program product embodiments, and/or combinations and sub-combinations thereof described herein may be used to gradually modify different parts of a type system implementation to provide more and better type inference.

FIG. 1 shows a block diagram of an example environment 100 for determining lineage information for data records. The environment 100 may include data sources 102, data targets 104, and an integration platform 110.

Data sources 102 (e.g., data source 102A, data source 102B, data source 102C, etc.) may include an application programming interface (API) and/or any other technical resource. Although only three data sources 102 (e.g., data source 102A, data source 102B, data source 102C, etc.) are shown in FIG. 1 for reference, the environment 100 may include any number of data sources 102. According to some embodiments, one or more of the data sources 102 may represent a plurality of APIs that the integration platform 110 may interact with to receive and update data. An API exposed by a data source 102 may adhere to any API architectural style, design methodologies, and/or protocols. For example, an API exposed by data sources 102 may include a Web-API such as a RESTful API or a SOAP API, a remote procedure call (RPC) API, a Java Database Connectivity (JDBC) API, a streaming API, and/or any other type of API. According to some embodiments, one or more of the data sources 102 may be and/or include data storage mediums (e.g., data lakes, data silos, data buckets, virtual storage, remote storage, physical storage devices, relational databases, etc.) of any type/form and configured to store data in any form and/or representation, such as raw data, transformed data, replicated data, semi-structured data (CSV, logs, XML, etc.), unstructured data, binary data (images, audio, video, etc.), and/or the like.

Data targets 104 (e.g., data target 104A, data target 104B, data target 104C, etc.) may be any type of API, technical resource, and/or system to be included in an integration flow. Although only three data targets 104 (e.g., data target 104A, data target 104B, data target 104C, etc.) are shown in FIG. 1 for reference, the environment 100 may include any number of data targets 104. According to some embodiments, one or more of the targets 104 may represent APIs that adhere to any API architectural style, design methodologies, and/or protocols. For example, an API exposed by data targets 103 may include a Web-API such as a RESTful API or a SOAP API, a remote procedure call (RPC) API, a Java Database Connectivity (JDBC) API, a streaming API, and/or any other type of API. Although the data sources 102 are shown in FIG. 1 as being separate and distinct from the data targets 103, according to some embodiments, there may be overlap between the sources and the targets. For example, a data source in one integration application may be a data target in a different integration application.

The integration platform 110 may be and/or include a system and/or software platform configured to access a plurality of software applications, services, and/or data sources. The integration platform 110 may be configured to design, maintain, and deploy integration flows based on the disparate software applications, services, and/or data sources. For example, the integration platform 110 may include/incorporate an enterprise service bus (ESB) architecture, a micro-service architecture, a service-oriented architecture (SOA), and/or the like. According to some embodiments, the integration platform 110 may allow a user to build and deploy integrations that communicate with and/or connect to third-party systems and provide additional functionalities that may be used to further integrate data from a plurality of organizational and/or cloud-based data sources. The integration platform 110 may allow users to build integration flows and/or APIs, and to design integration applications that access data, manipulate data, store data, and leverage data from disparate technical resources.

The integration platform 110 may include an interface module 112, connectors 114, an integrated development module 116, a runtime services module 118, and a visualization module 130.

The interface module 112 may allow users to design and/or manage integration applications and integration flows that access disparate data sources 102 and data targets 104. The interface module 112 may standardize access to various data sources, provide connections to third-party systems and data, and provide additional functionalities to further integrate data from a plurality of organizational and/or cloud-based sources. The interface module 112 may include a graphical design environment and/or generate a graphical user interface (GUI) that enables a user to build, edit, deploy, monitor, and/or maintain integration applications. Data communicated between integration applications may be transformed between the integration via an expression language and/or functional programming language designed for transforming data, such as DataWeave and/or the like.

The connectors 114 may provide connections between the integration platform and external resources, such as databases, APIs for software as a service (SaaS) applications, and many other endpoints. The connectors 114 may be APIs that are pre-built and selectable within the interface module 112, for example, using a drag-and-drop interface. The connectors 114 may provide reliable connectivity solutions to connect to a wide range of applications integrating with any other type of asset (e.g., Salesforce, Amazon S3, Mongo Db, Slack, JIRA, SAP, Workday, Kafka, etc.). The connectors 114 may enable connection to any type of API, for example, APIs such as SOAP APIs, REST APIs, Bulk APIs, Streaming APIs, and/or the like. The connectors 114 may facilitate the transfer of data from a source (e.g., the data sources 102, etc.) and a target (e.g., the data targets 104, etc.) by modeling the data into a file and/or the like, such as separated value files (CSV*, TSV, etc.), JavaScript Object Notation (JSON) text files delimited by new lines, JSON Arrays, and/or any other type of file. The connectors 114 may be responsible for and/or facilitate connecting to the data sources 102 and the data targets 104, authenticating, and performing raw operations to receive and insert data. The connectors 116 may support OAuth, Non-Blocking operations, stateless connection, low-level error handling, and reconnection.

The integrated development module 116 may consolidate the basic tools required to write and/or test software. The integrated development module 116 may enable developers, programmers, users, and/or the like to use various tools throughout software code creation, building, and testing. For example, the integrated development module 116 may include and/or support text editors, code libraries, compilers, and/or test platforms for developers, programmers, users, and/or the like for software code creation, building, and/or testing. The integrated development module 116 may simplify software development and can identify and minimize coding mistakes and/or typos.

According to some embodiments, the integrated development module 116 may be used to statically type-check functional programming languages and ensure that, before execution of an associated script, every variable and function has a constraint (a type) assigned to it, and the values assigned to variables and/or the arguments for a function call respect its constraints.

The integrated development module 116 may include one or more compilers (not shown) for compiling a source code representation 105 in a functional programming language to a corresponding typed intermediate representation. The integrated development module 116 may include a type system 120. The type system 120 may include type definitions 122 that specify formal types that a program/application will allow, and type rules 124 that assigns a type and/or similar property to the various constructs of a functional programming language (e.g., DataWeave, Lisp, Python, Erlang, Haskell, Clojure, etc.), such as variables, expressions, functions, and/or the like. The type system 120 may use types to formalize and enforce categories used for data types such as String, Boolean, Number, Date, and/or the like. The type system 120 may use types to formalize and enforce categories used for data types such as composite types such as Array, Object, Function, and also complex types such as Any, Nothing, Union, Intersection, and/or the like.

The type definitions 122 and type rules 124 may be used by a type checker 126 to detect errors in the script of a functional programming language and/or a typed intermediate representation of code compiled by a compiler (not shown) of the integrated development module 116. Type check analysis performed by the type checker 126 may be used to determine whether or not one or more portions of script and/or code (e.g., in an intermediate representation of the code) have violated one or more type rules 124.

The integrated development module 116 may be used to retype data types of the type system 120 to add valuable semantic information to the data types (that is automatically generated and/or hidden from a developer/programmer). For example, consider code 1 below:
Code 1:
fun square(x: Number|Null): Number=
  if (x==null)
    −1
  else
    x*x The function square takes a value of x, which is known to be either a number (e.g., −1) or a null. The function square is expected to return a Number (e.g., −1). The function square invokes a check as to whether x is equal to Null, if it is, it just returns −1, if it is not, a system compiler and/or programmer then knows that x has to be a Number (since it is not equal to null), and executes/performs the operation x*x. However, traditional type systems are unable to determine that on the else branch of the function square, x can only be a Number, and will emit an error stating that it is not possible to multiply two Null values.

The expression x==null has type (Boolean) that can be either true or false. According to some embodiments, the integrated development module 116 and/or the type system 120 may be used to enhance/change the type (Boolean) of the expression to include information about the types of certain variables. The type system 120 may be used to enhance/change the type (Boolean) of the expression based on information about the types of certain variables, such that x==null is given a more robust and/or interesting type that can be expressed as Boolean{true=>x: Null, false=>x: !Null}, which states that if the expression is true, then x has type Null, and if the expression is false, then x does not have type Null (it can have any other type).

If the type system 120 is type-inferring x on a scope where it is known that x==null evaluated to true, the type system 120 may use the information to better infer the type of x. Therefore, for code 1, since it is known that inside the true branch of an 'if', the guarding expression is true, the type system 120 can deduce that in −1, x must have type Null. Inside the else branch of code 1, x cannot have type Null, since x has type Number|Null, and x cannot have type Null, the type system 120 can deduce that that x must have type Number, making x*x a valid expression.

According to some embodiments, the integrated development module 116 may include a visualization module 130. The visualization module 130 may be an analytics platform that allows developers, programmers, users, and/or the like to view outputs of any component of the integration platform 110. For example, the visualization module 130 may receive data and/or information from any component of the integration platform 110 and display and/or cause display (e.g., via the interface module 112, etc.) of one or more charts, tables, graphs, and/or the like indicative of the received data. For example, the type system 120 can generate a data graph, such as a type graph, that maps the flow of types through a program. A data graph and/or type graph may be a graph of type dependencies between expressions, on which the nodes with no incoming edges are trivially typed expressions (e.g., the expression 42 has type Number), including a root node with no outgoing edges that represents the type of the main expression, called DocumentNode.

Figure 2:
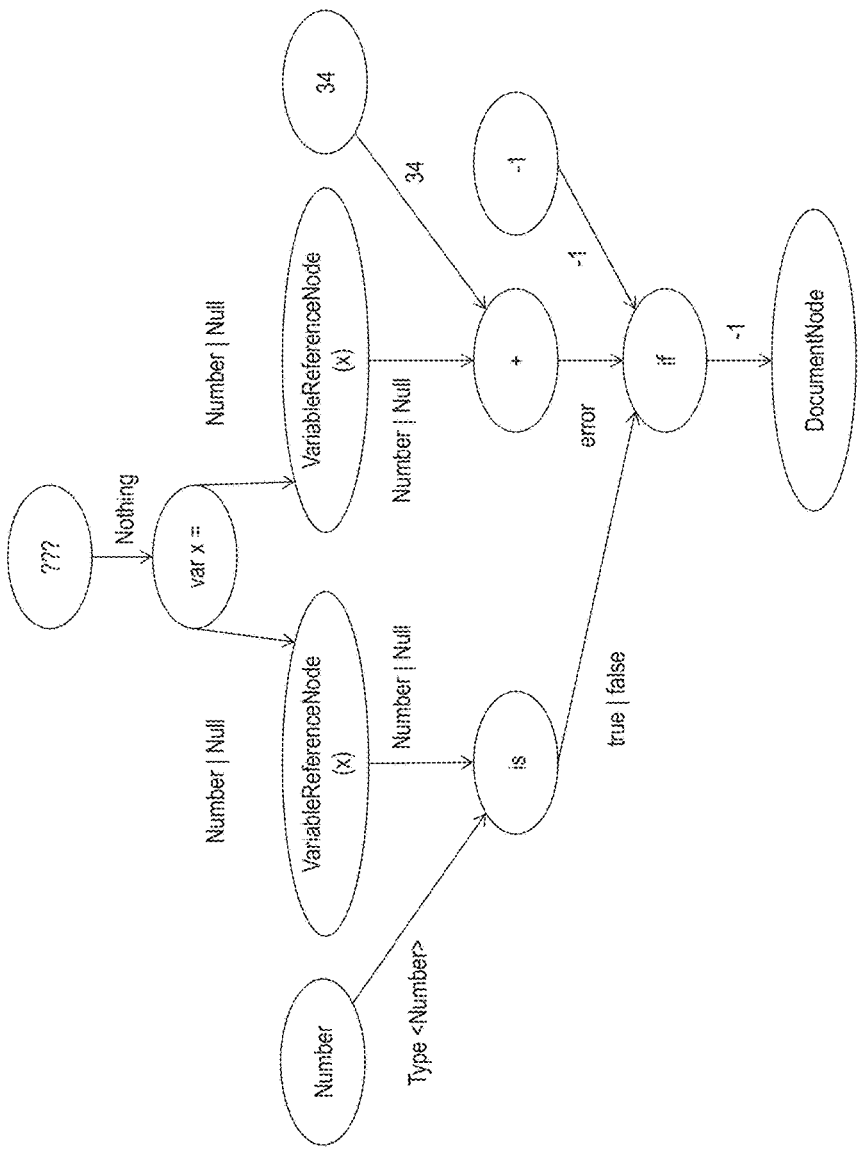
FIG. 2 shows an example data graph, according to some embodiments.

The visualization module 130 may display and/or cause display (e.g., via the interface module 112, etc.) of the data graph. For example, FIG. 2 shows an example type graph 200 for the following code 2:
Code 2:
var x: Number|Null=???
- - -
if (x is Number)
  x+34
else
  −1

As shown FIG. 2, the type graph 200 includes a (var x=) node, with outgoing edges of Number|Null, that go directly to two (x) nodes that are used for the is operator (e.g., x is Number) and for the + operator (e.g., x+34).

Figure 3:
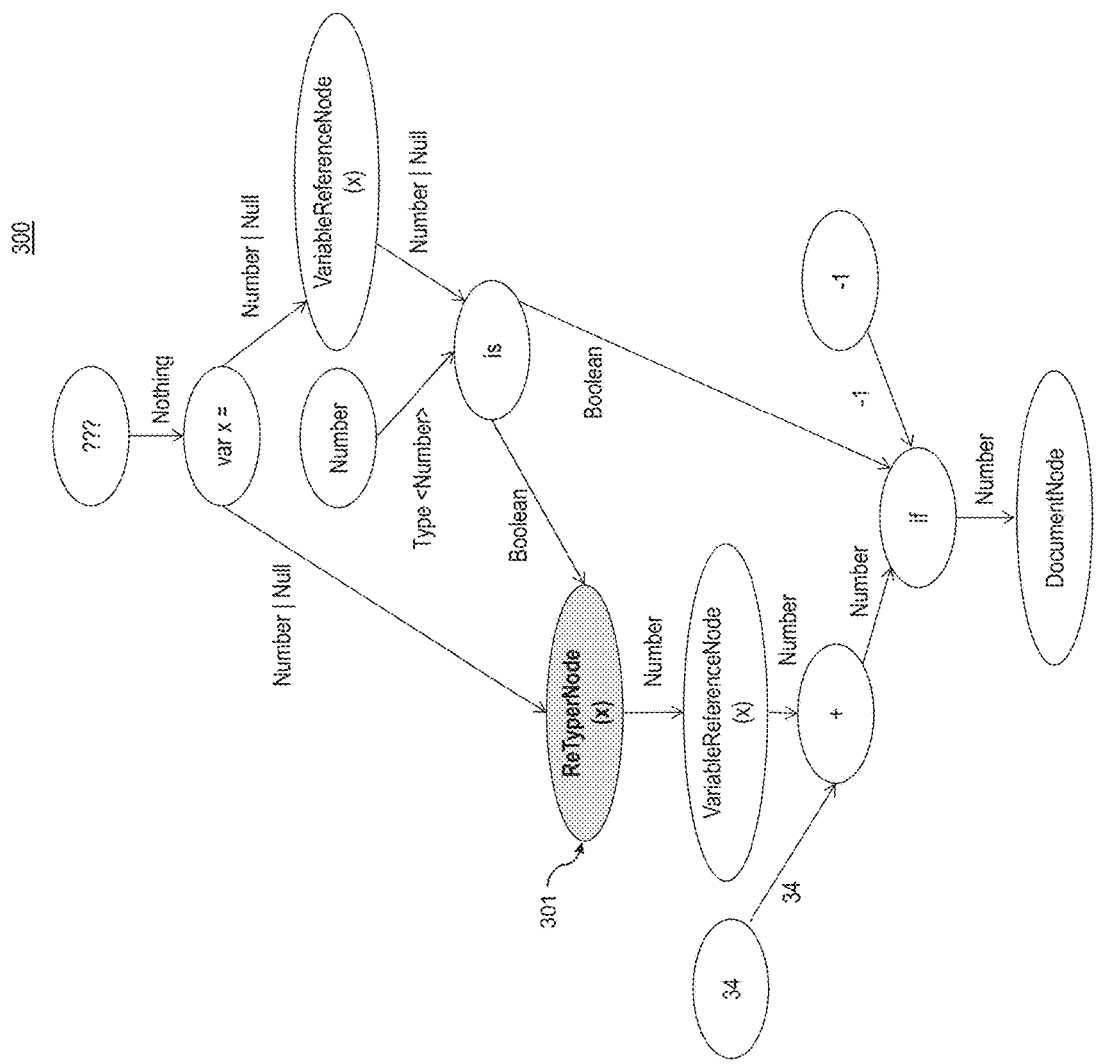
FIG. 3 shows an example data graph comprising a retyper node to facilitate single variable retyping, according to some embodiments.

Returning to FIG. 1, according to some embodiments, to facilitate data flow retyping for functional languages, the integrated development module 116 (e.g., the type system 120, etc.) may include a retyper module 128. The retyper module 128 may inject a new kind of node into a data graph and/or type graph referred to herein as a RetyperNode between the node that gives the type of a variable (e.g., the variable definition) and the node that uses the variable (e.g., the variable reference). A RetyperNode depends not only on the original type of a variable but also on any guarding expression that will add valuable information about the type of a variable on a given scope. A RetyperNode may combine information about the original type of a variable and any guarding expression that will add valuable information about the type of a variable on a given scope to assign a more interesting type to the variable that is being referenced. For example, FIG. 3 shows an example type graph 300 for the previously described code (code 2) that includes a RetyperNode 301. The type graph 300 is a modified version of the type graph 200 (FIG. 2) according to the methods and systems described herein for data flow retyping for functional programming languages.

As shown in FIG. 3, the (x) node used on the (is) operator node gets its information directly from the (var x=) node (e.g., Number|Null). However, the (x) node that provides the type to the (+) operator node has RetyperNode 302 injected node between itself and the (var x=) node. The last node receives the type of the variable from the (var x=) node (e.g., Number|Null) and also receives information from the (is) operator node. After retyping the variable x, the RetyperNode 301 outputs a stronger type—e.g., Number.

Returning to FIG. 1, as described, the type system 120 allows different parts of a data type scheme to be modified to provide more and better type inference than traditional type systems supporting functional languages. For example, the type checker 126 may extend the type check of operators like==, is, and !=so they return an enhanced Boolean. The type checker 126 may extend the type check of logical operators like and, or, and not so they can correctly combine constraints generated by other operators. For example, type checker 126 can type check the code 3 shown below correctly because on the else branch, the type system 120 can deduce that x cannot be a String or Null, and can only be a Number.

Code 3:
fun square(x: Number|String|Null): Number=
  if (x is String or x is Null)
    −1
  else
    x*x The retyper module 128 may be used for single variable retyping, multivariable retyping, and/or multi-level retyping to address multiple type guards and/or restraints. For example, for single variable retyping based on code 4 shown below, the integrated development module 116 may cause the visualization module 130 to output a data graph and/or type graph 400 shown in FIG. 4.

Code 4:
var x: Number|String=???
- - -
(if (x is Number)
  x
else
  −1)

Figure 4:
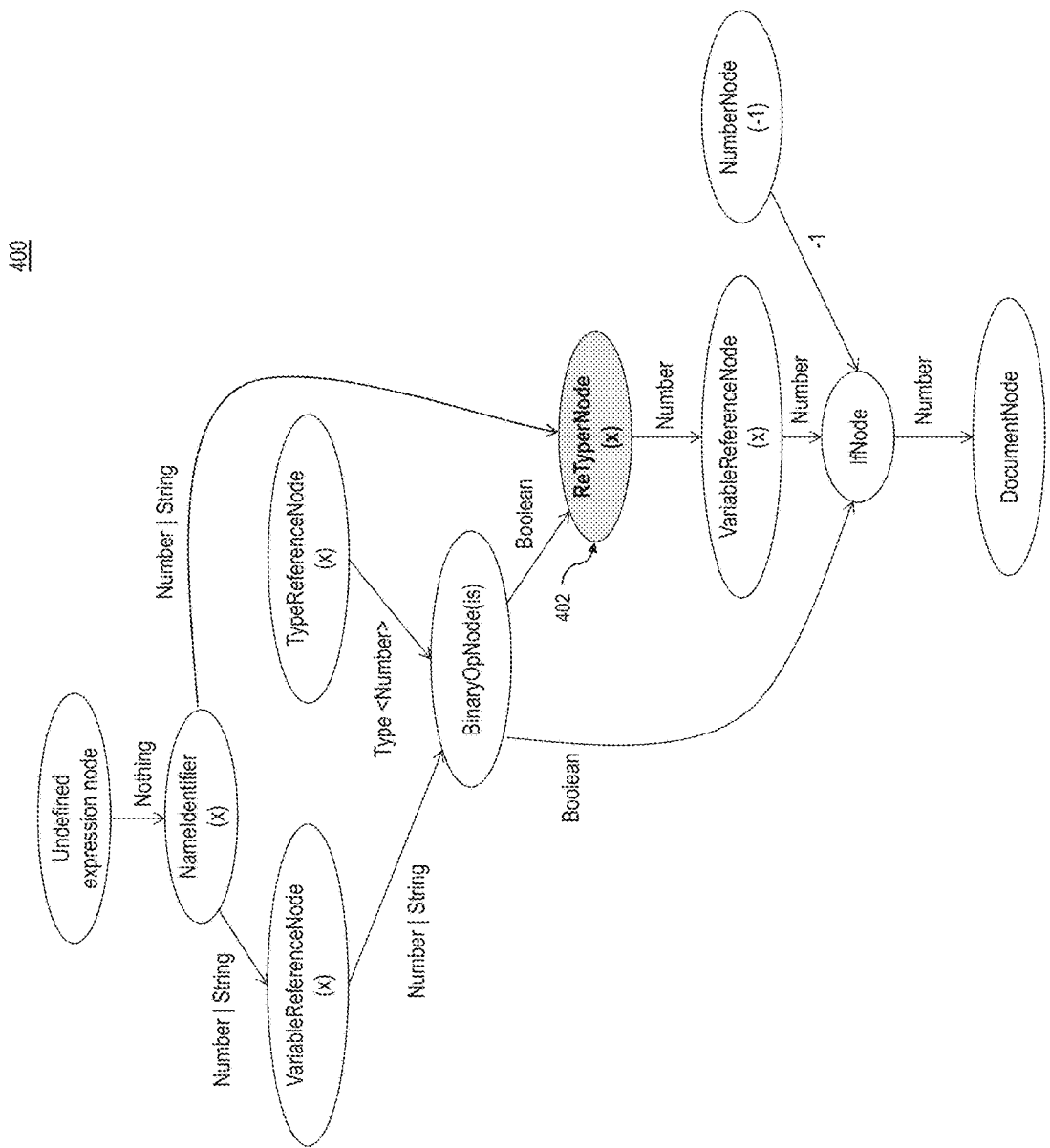
FIG. 4 shows an example data graph comprising a retyper node to facilitate single variable retyping, according to some embodiments.

As shown in FIG. 4, a RetyperNode 402 may be injected into the data flow for code 4 to retype the variable x. For multivariable retyping based on code 5 shown below, the integrated development module 116 may cause the visualization module 130 to output a data graph and/or type graph 500 shown in FIG. 5.

Code 5:
var x: Number|String=???
vary: Number=???
- - -
(if (x is Number)
  x+y
else
  −1)

Figure 5:
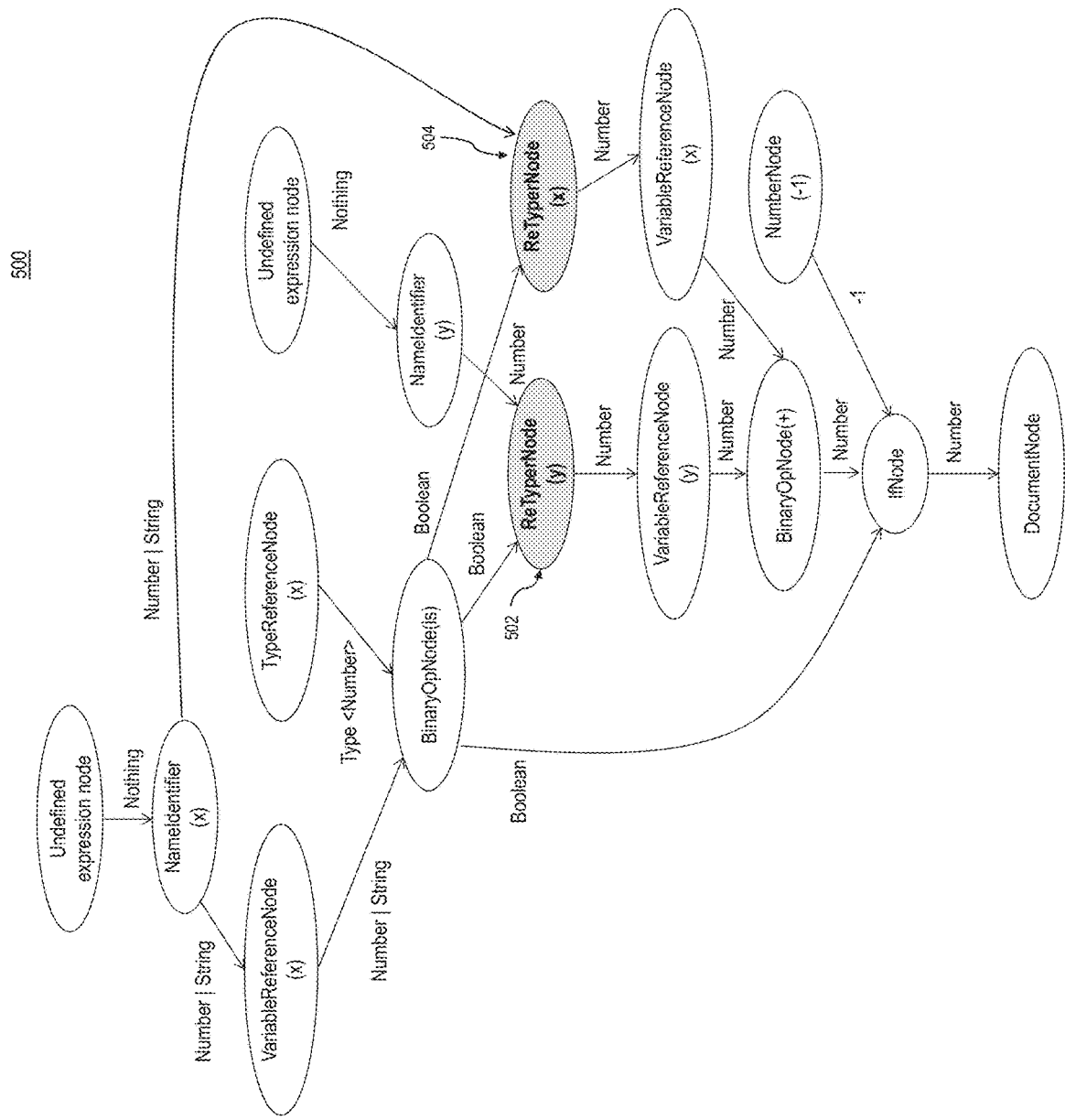
FIG. 5 shows an example data graph comprising retyper nodes that facilitate multivariable retyping, according to some embodiments.

As shown in FIG. 5, a RetyperNode 502 may be injected into the data flow for code 5 to retype the variable y and a RetyperNode 504 may be injected into the data flow for code 5 to retype the variable x. For multi-level retyping to address multiple type guards and/or restraints based on code 6 shown below, the integrated development module 116 may cause the visualization module 130 to output a data graph and/or type graph 600 shown in FIG. 6.

Code 6:
var x: Number|String=???
var y: Number|Boolean=???
- - -
(if (x is Number)
  if (y is Number)
    x+y
  else
    −2
else
  −1)

Figure 6:
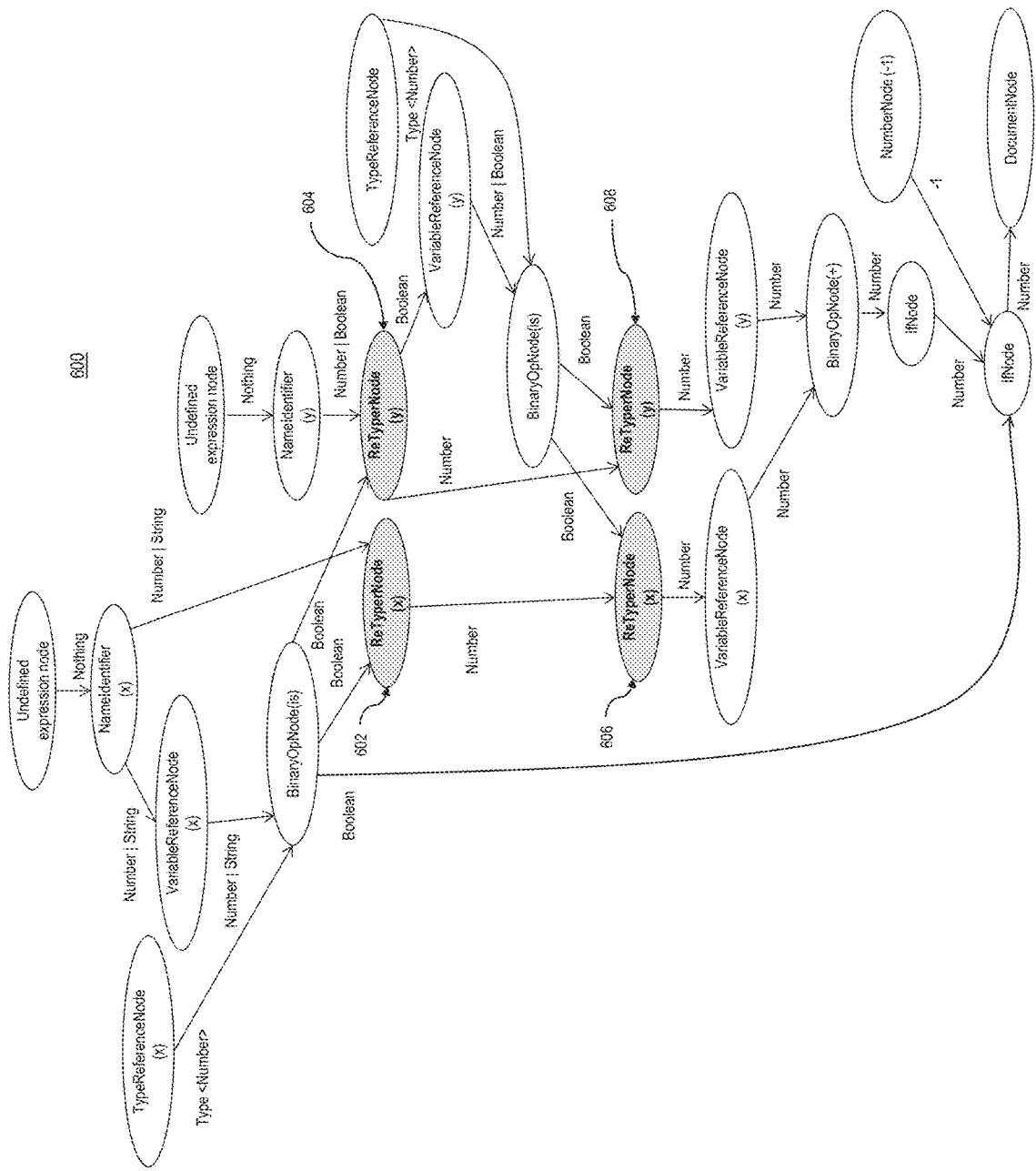
FIG. 6 shows an example data graph comprising retyper nodes that facilitate multilevel retyping to address multiple guards, according to some embodiments.

As shown in FIG. 6, a RetyperNode 602 and a RetyperNode 606 may be injected into the data flow for code 6 to retype the variable x, and a RetyperNode 604 and a RetyperNode 608 may be injected into the data flow for code 6 to retype the variable y. The variables x and y are retyped twice since multiple guards are creating extra information. The input edges to the RetyperNode 606 and RetyperNode 608 are not the original types defined for the variables x and y, respectively. Instead, the input edges to the RetyperNode 606 and RetyperNode 608 are the outcomes of the RetyperNode 602 and RetyperNode 604, respectively. The RetyperNode 602 modifies and/or improves the type of variable x to Number, but does nothing for variable y. The RetyperNode 606 keeps the information that variable x is a Number, but it also modifies and/or enhances the type of variable y to Number.

Returning to FIG. 1, according to some embodiments, the integration platform 110 may also support dynamic type checking and/or gradual typing. For example, the type checker 126 may be configured to execute a type checking for a programming language at the runtime of an application/program. The integration platform 110 may include a runtime services module 118. The runtime services module 118 may include runtime components for building, assembling, compiling, and/or creating executable code that may be type-checked and retyped as described herein. According to some embodiments, runtime components may create interpreted code, such as code where one or more variables and/or data elements have been retyped as described herein, to be parsed and applied upon execution. In some embodiments, runtime components may include a variety of intermediary hardware and/or software that runs and processes the output of data flows and/or any component of the integration platform 110.

Figure 7:
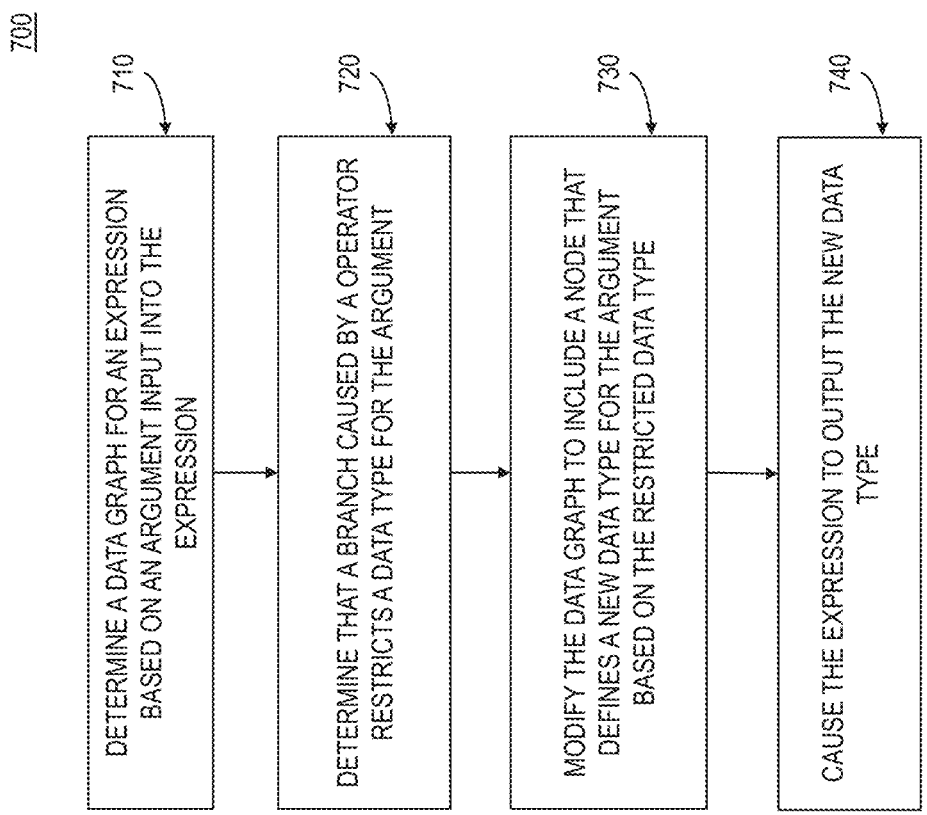
FIG. 7 shows an example of a method for data flow retyping for functional languages, according to some embodiments.

FIG. 7 is a flowchart illustrating a method 700 for data flow retyping for functional languages, according to some embodiments. Method 700 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art(s).

In 702, a type system (e.g., the type system 120 of FIG. 1, etc.) may determine a data graph for an expression of a functional programming language. For example, the type system may determine a data graph, such as a type graph and/or the like, for an expression of a functional programming language based on a data flow for an argument input to the expression. The type system may determine the data flow for the argument based on semantic analysis of at least a portion of the functional programming language. The data graph may include a plurality of nodes. A first node of the plurality of nodes can define at least two data types for the argument.

In 704, the type system may determine that a branch caused by an operator associated with a second node of the plurality of nodes restricts a data type of the at least two data types for the argument. For example, the type system may determine a type guard restricting the data type. The operator associated with the second node may include at least one of a logical operator or a conditional operator.

In 706, the type system may modify the plurality of nodes to include a third node before the second node. For example, the type system may modify the plurality of nodes to include the third node before the second node based on determining that the branch of the operator associated with the second node restricts the data type for the argument. The third node may define a new data type for the argument based on the restricted data type for the argument and the branch. The third node may be connected to at least one edge that feeds the second node.

In 708, the type system may cause the expression to output the new data type. For example, the type system may cause the expression to output the new data type based on a value of the argument and the third node. The type system may cause the expression to output the new data type by statically typing the new data type based on the value of the argument and the third node. The type system may cause the expression to output the new data type by dynamically typing the new data type based on the value of the argument and the third node.

The method 700 may further include the type system determining a data graph for another expression of the functional programming language. The type system may determine a data graph for another expression of the functional programming language based on a data flow for a first argument and a second argument input to the another expression. The data graph for the for another expression may include another plurality of nodes. A first node of the another plurality of nodes may define at least two data types for the first argument and a second node of the another plurality of nodes may define a data type for the second argument.

The type system may modify the another plurality of nodes to include a fourth node before a third node of the another plurality of nodes. The type system may modify the another plurality of nodes to include the fourth node before the third node based on a branch caused by an operator associated with a third node of the another plurality of nodes restricting a data type of the at least two data types for the first argument. The fourth node may define a new data type for the first argument based on the restricted data type for the first argument and the branch caused by the operator associated with the third node of the another plurality of nodes.

The type system may modify the another plurality of nodes to include a sixth node before a fifth node of the another plurality of nodes. The type system may modify the another plurality of nodes to include the sixth node before the fifth node based on a branch caused by an operator associated with the fifth node restricting the data type for the second argument. The sixth node may define a new data type for the second argument based on the restricted data type for the second argument and the branch caused by the operator associated with the fifth node of the another plurality of nodes.

The type system may cause the another expression to output the new data type. The type system may cause the another expression to output the new data type based on at least one of: a value of the first argument and the fourth node, or a value of the second argument and the sixth node.

Figure 8:
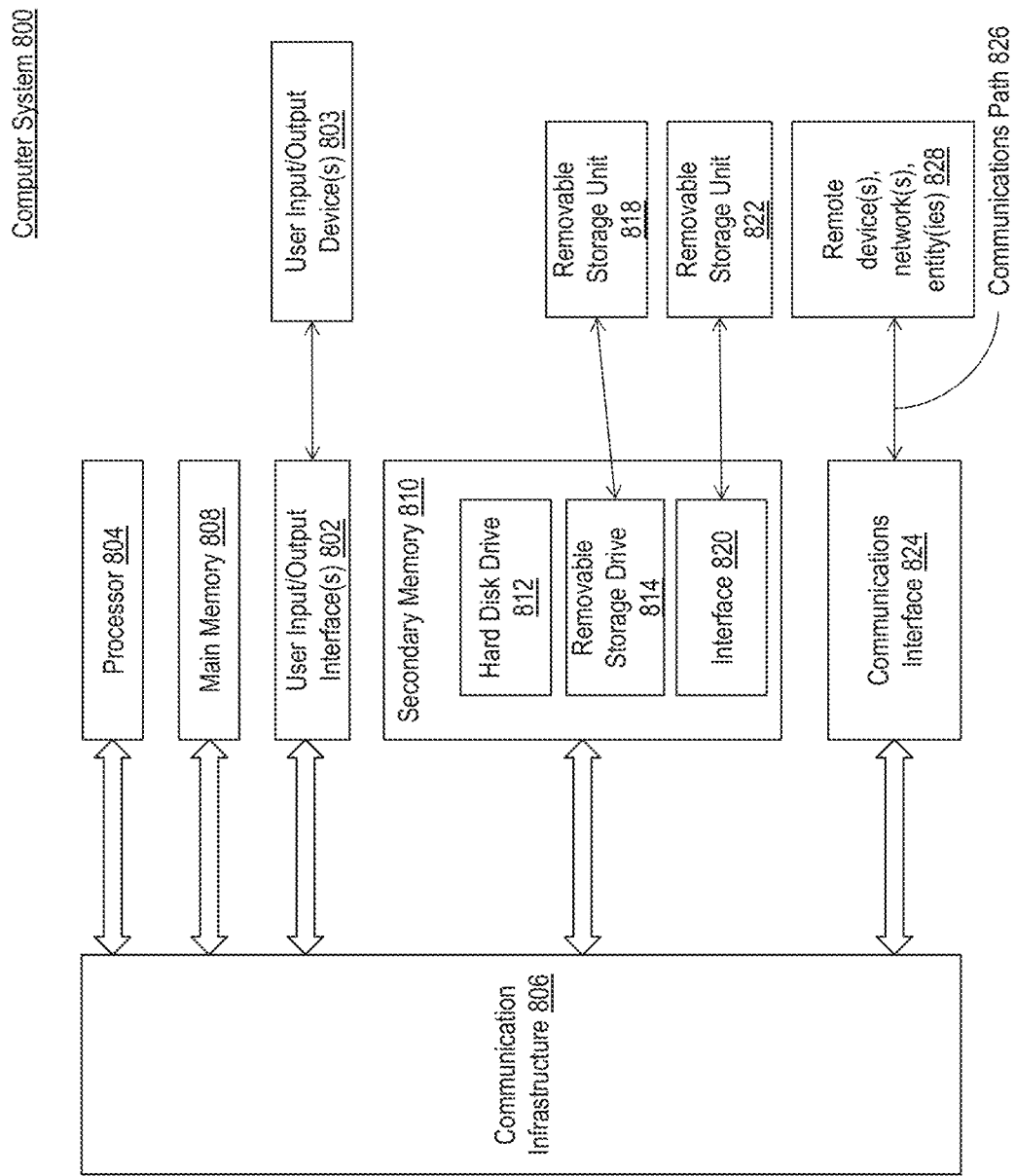
FIG. 8 shows an example computer system, according to embodiments of the present disclosure.

FIG. 8 is an example computer system useful for implementing various embodiments. Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 802, such as monitors, keyboards, pointing devices, etc., which may communicate with communication infrastructure or bus 806 through user input/output device(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, a tape backup device, and/or any other storage device/drive.

Removable storage drive 814 may interact with a removable storage unit 818. The removable storage unit 818 may include a computer-usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to the removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for flow retyping for a functional programming language comprising:
   determining a data graph for an expression of a functional programming language based on a data flow for an argument input to the expression, wherein the data graph comprises a plurality of nodes, and wherein a first node of the plurality of nodes defines at least two data types for the argument;
determining that a branch caused by an operator associated with a second node of the plurality of nodes restricts a data type of the at least two data types for the argument;
modifying, based on determining that the branch of the operator associated with the second node restricts the data type for the argument, the plurality of nodes to include a third node before the second node, wherein the third node defines a new data type for the argument based on the restricted data type for the argument and the branch; and
causing, based on a value of the argument and the third node, the expression to output the new data type.

2. The computer-implemented method of claim 1, further comprising determining the data flow for the argument based on semantic analysis of at least a portion of the functional programming language.

3. The computer-implemented method of claim 1, wherein the operator associated with the second node comprises at least one of a logical operator or a conditional operator.

4. The computer-implemented method of claim 1, wherein the third node is connected to at least one edge that feeds the second node.

5. The computer-implemented method of claim 1, further comprising:
determining a data graph for another expression of the functional programming language based on a data flow for a first argument and a second argument input to the another expression, wherein the data graph for the another expression comprises another plurality of nodes, and wherein a first node of the another plurality of nodes defines at least two data types for the first argument and a second node of the another plurality of nodes defines a data type for the second argument;
modifying, based on a branch caused by an operator associated with a third node of the another plurality of nodes restricting a data type of the at least two data types for the first argument, the another plurality of nodes to include a fourth node before the third node, wherein the fourth node defines a new data type for the first argument based on the restricted data type for the first argument and the branch caused by the operator associated with the third node of the another plurality of nodes;
modifying, based on a branch caused by an operator associated with a fifth node of the another plurality of nodes restricting the data type for the second argument, the another plurality of nodes to include a sixth node before the fifth node, wherein the sixth node defines a new data type for the second argument based on the restricted data type for the second argument and the branch caused by the operator associated with the fifth node of the another plurality of nodes; and
causing the another expression to output the new data type based on at least one of a value of the first argument and the fourth node, or a value of the second argument and the sixth node.

6. The computer-implemented method of claim 1, wherein causing the expression to output the new data type comprises statically typing the new data type based on the value of the argument and the third node.

7. The computer-implemented method of claim 1, wherein causing the expression to output the new data type comprises dynamically typing the new data type based on the value of the argument and the third node.

8. A system comprising:
a memory; and
at least one processor coupled to the memory and configured to:
determine a data graph for an expression of a functional programming language based on a data flow for an argument input to the expression, wherein the data graph comprises a plurality of nodes, and wherein a first node of the plurality of nodes defines at least two data types for the argument;
determine that a branch caused by an operator associated with a second node of the plurality of nodes restricts a data type of the at least two data types for the argument;
modify, based on determining that the branch of the operator associated with the second node restricts the data type for the argument, the plurality of nodes to include a third node before the second node, wherein the third node defines a new data type for the argument based on the restricted data type for the argument and the branch; and
cause, based on a value of the argument and the third node, the expression to output the new data type.

9. The system of claim 8, wherein the at least one processor is further configured to determine the data flow for the argument based on semantic analysis of at least a portion of the functional programming language.

10. The system of claim 8, wherein the operator associated with the second node comprises at least one of a logical operator or a conditional operator.

11. The system of claim 8, wherein the third node is connected to at least one edge that feeds the second node.

12. The system of claim 8, wherein the at least one processor is further configured to:
determine a data graph for another expression of the functional programming language based on a data flow for a first argument and a second argument input to the another expression, wherein the data graph for the for another expression comprises another plurality of nodes, and wherein a first node of the another plurality of nodes defines at least two data types for the first argument and a second node of the another plurality of nodes defines a data type for the second argument;
modify, based on a branch caused by an operator associated with a third node of the another plurality of nodes restricting a data type of the at least two data types for the first argument, the another plurality of nodes to include a fourth node before the third node, wherein the fourth node defines a new data type for the first argument based on the restricted data type for the first argument and the branch caused by the operator associated with the third node of the another plurality of nodes;
modify, based on a branch caused by an operator associated with a fifth node of the another plurality of nodes restricting the data type for the second argument, the another plurality of nodes to include a sixth node before the fifth node, wherein the sixth node defines a new data type for the second argument based on the restricted data type for the second argument and the branch caused by the operator associated with the fifth node of the another plurality of nodes; and
cause the another expression to output the new data type based on at least one of: a value of the first argument and the fourth node, or a value of the second argument and the sixth node.

13. The system of claim 8, wherein to cause the expression to output the new data type the at least one processor is further configured to:
  cause the expression to output the new data type by statically typing the new data type based on the value of the argument and the third node.

14. The system of claim 8, wherein to cause the expression to output the new data type the at least one processor is further configured to:
  cause the expression to output the new data type by dynamically typing the new data type based on the value of the argument and the third node.

15. A non-transitory computer-readable device having instructions stored thereon that, when executed by at least one computing device, cause the at least one computing device to perform operations comprising:
  determining a data graph for an expression of a functional programming language based on a data flow for an argument input to the expression, wherein the data graph comprises a plurality of nodes, and wherein a first node of the plurality of nodes defines at least two data types for the argument;
  determining that a branch caused by an operator associated with a second node of the plurality of nodes restricts a data type of the at least two data types for the argument;
  modifying, based on determining that the branch of the operator associated with the second node restricts the data type for the argument, the plurality of nodes to include a third node before the second node, wherein the third node defines a new data type for the argument based on the restricted data type for the argument and the branch; and
  causing, based on a value of the argument and the third node, the expression to output the new data type.

16. The non-transitory computer-readable device of claim 15, wherein the operations further comprise determining the data flow for the argument based on semantic analysis of at least a portion of the functional programming language.

17. The non-transitory computer-readable device of claim 15, wherein the operator associated with the second node comprises at least one of a logical operator or a conditional operator.

18. The non-transitory computer-readable device of claim 15, wherein the third node is connected to at least one edge that feeds the second node.

19. The non-transitory computer-readable device of claim 15, wherein the operations further comprise:
  determining a data graph for another expression of the functional programming language based on a data flow for a first argument and a second argument input to the another expression, wherein the data graph for the for another expression comprises another plurality of nodes, and wherein a first node of the another plurality of nodes defines at least two data types for the first argument and a second node of the another plurality of nodes defines a data type for the second argument;
  modifying, based on a branch caused by an operator associated with a third node of the another plurality of nodes restricting a data type of the at least two data types for the first argument, the another plurality of nodes to include a fourth node before the third node, wherein the fourth node defines a new data type for the first argument based on the restricted data type for the first argument and the branch caused by the operator associated with the third node of the another plurality of nodes;
  modifying, based on a branch caused by an operator associated with a fifth node of the another plurality of nodes restricting the data type for the second argument, the another plurality of nodes to include a sixth node before the fifth node, wherein the sixth node defines a new data type for the second argument based on the restricted data type for the second argument and the branch caused by the operator associated with the fifth node of the another plurality of nodes; and
  causing the another expression to output the new data type based on at least one of a value of the first argument and the fourth node, or a value of the second argument and the sixth node.

20. The non-transitory computer-readable device of claim 15, wherein causing the expression to output the new data type comprises at least one of statically typing the new data type based on the value of the argument and the third node, or dynamically typing the new data type based on the value of the argument and the third node.

* * * * *